No. 811,853. PATENTED FEB. 6, 1906.
F. LAMPLOUGH.
RADIATOR, STEAM CONDENSER, AND THE LIKE.
APPLICATION FILED APR. 26, 1905.
3 SHEETS—SHEET 1.
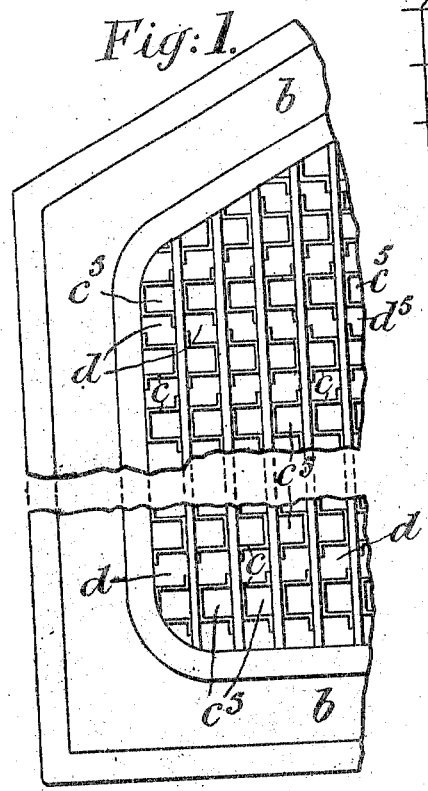
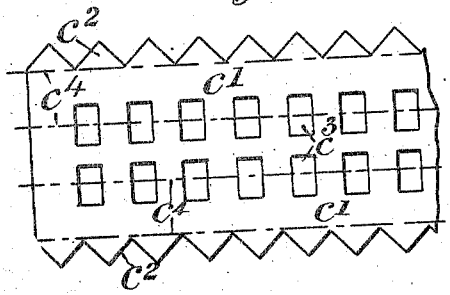
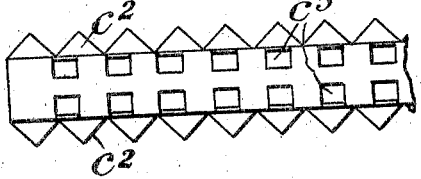
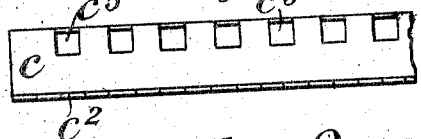
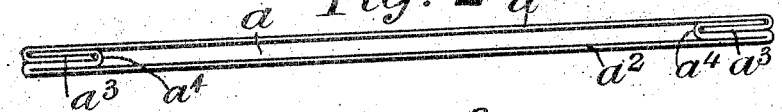
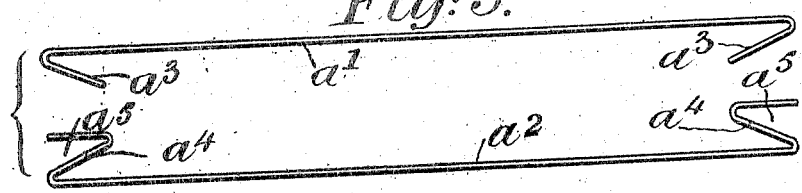
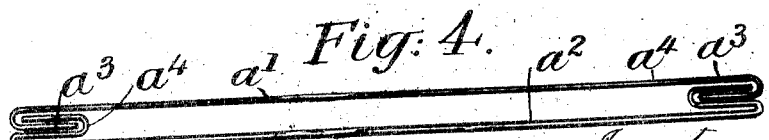
Witnesses.
Inventor:
Frederick Lamplough
By Knight Bros Attys No. 811,853. PATENTED FEB. 6, 1906.
F. LAMPLOUGH.
RADIATOR, STEAM CONDENSER, AND THE LIKE.
APPLICATION FILED APR. 26, 1905.
3 SHEETS—SHEET 2.
Fig: 9. Fig: 10.
 
Fig: 11. Fig: 13.
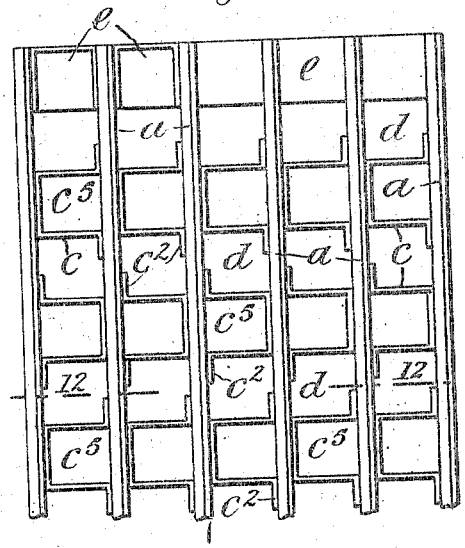 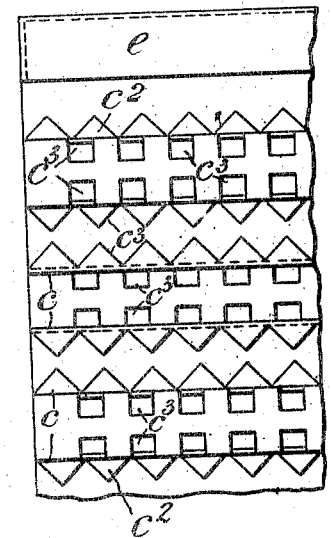
Fig: 12.
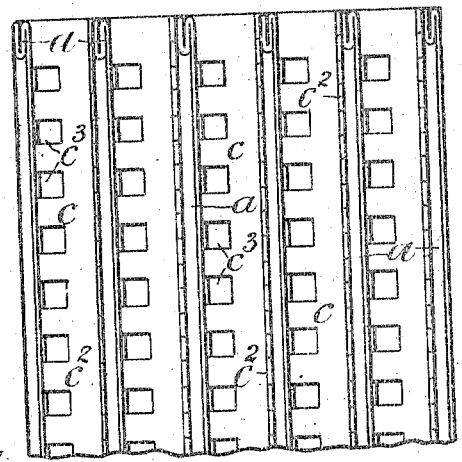
Fig. 10ᵃ
Witnesses
Inventor
Frederick Lamplough
By Knight Bros Attys

UNITED STATES PATENT OFFICE.

FREDERICK LAMPLOUGH, OF WILLESDEN, ENGLAND.

RADIATOR, STEAM-CONDENSER, AND THE LIKE.

No. 811,853.  Specification of Letters Patent.  Patented Feb. 6, 1906.

Application filed April 26, 1905. Serial No. 257,470.

*To all whom it may concern:*

Be it known that I, FREDERICK LAMPLOUGH, a subject of the King of Great Britain, residing at Willesden, in the county of Middlesex, England, have invented new and useful Improvements in Radiators, Steam-Condensers, and the Like, of which the following is a specification.

The invention has for its object improvements on that class of radiator, steam-condenser, and the like described in the specification of United States Letters Patent No. 713,776, dated November 18, 1902, and relates to an improved construction of gilled flat tubes to be used therein, to headers for filling the spaces between the flat tubes at the top and bottom thereof to form a continuous surface to which the upper and lower parts of the tank can be sweated or soldered, and to a filling-cap serving as a safety-valve to permit escape of steam from the radiator in the event of undue pressure arising therein, and thus prevent injury thereto.

I will describe the invention by the aid of the accompanying drawings, in which—

Figure 14:
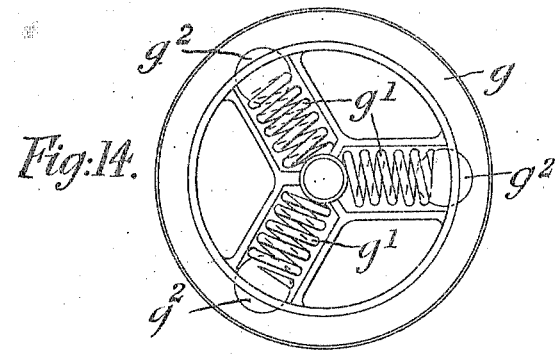
Figure 15:
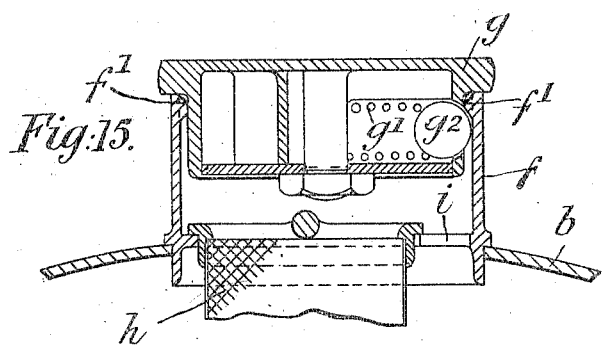
Figure 16:
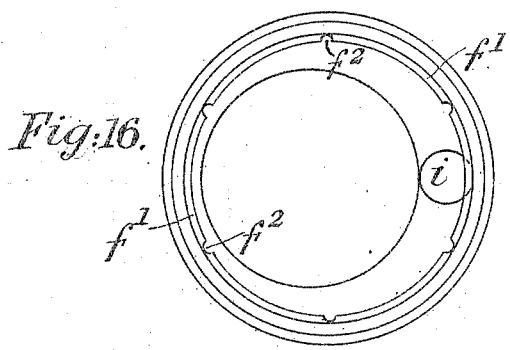

Figure 1 is a front view of parts of the improved radiator, steam-condenser, or the like. Fig. 2 is an end view of one of the improved flat tubes before the gills are applied thereto. Fig. 3 is an end view of the two parts used in the formation of these tubes. Fig. 4 is an end view of the parts shown in Fig. 3 when assembled and partially closed down to form the tube. Fig. 5 is a plan of a strip of sheet metal stamped to the form preferred to produce, when properly bent, the improved gills. Figs. 6 and 7 are side views drawn at right angles to each other, and Fig. 8 is a cross-section of said stamped-metal sheet bent into the form required. Fig. 9 is a side view, and Fig. 10 is a cross-section, of one of the headers. Fig. $10^a$ is a cross-section of another form of header. Fig. 11 is an elevation of parts of a few of the flat tubes with the gills and headers. Fig. 12 is a horizontal section drawn on line 12 12 of Fig. 11, and Fig. 13 is a side elevation of Fig. 11. Fig. 14 is an under side view, and Fig. 15 is a cross-section, of the improved filling-cap; and Fig. 16 is a plan of the filling tube or nozzle.

In all the figures like parts are indicated by similar letters of reference.

$a\ a$ are the flat tubes. $b\ b$ are the upper and lower parts of the tank with which the ends of said tubes communicate. $c\ c$ are gills or radiating surfaces soldered to said tubes.

The flat tubes $a$ are each constructed of two rectangular pieces of sheet metal $a'\ a^2$, the piece $a'$ having a narrow portion $a^3$ along each of its long sides bent over toward the main body thereof, and the piece $a^2$ having a portion $a^4$ along each of its long sides bent first over toward the main body thereof and then outward, thus forming an outwardly-open groove $a^5$, into which the part $a^3$ is placed, as shown at Fig. 4, which figure represents the parts partially pressed together. When the parts are completely closed down, as shown at Fig. 2, the long edges are sweated or soldered to insure hermiticity. By these means a solid edge is obtained at both back and front, thus securing great strength and durability, it being impossible to injure said edges by either blows or friction.

The gills or radiating surfaces $c$ are formed from a stamping $c'$ of sheet metal, such as that shown at Fig. 5, having preferably serrated flanges $c^2$ and apertures $c^3$. This stamping is bent on the lines $c^4$ to produce the trough-shaped form shown at Figs. 6, 7, and 8, with outwardly-extending serrated flanges $c^2$, by which the same may be soldered across the sides of the flat tubes $a$ and preferably alternately on opposite sides thereof.

By the above construction of gills or radiating surfaces and their arrangement in the manner shown the air entering the spaces $c^5$ and $d$ can by passing through the apertures $c^3$ travel in every direction vertically toward the center of the fan, thus causing the air passing between the outer flat tubes $a$—that is, away from the center of the radiator—to have a greater cooling effect than if it passed through the spaces $c^5$ and $d$ without being able to pass from one to the other of said spaces.

If desired, the flanges $c^2$ may be of other form than that shown, or they may be plain, and the apertures $c^3$ may also be of other form.

$e\ e$ are headers or filling-in pieces which are placed between the top and bottom ends of the flat tubes $a$, to the sides of which they are soldered or sweated, and thus form a continuous flat surface, to which the top and bottom portions $b\ b$ of the tank are soldered. These headers or filling-in pieces are in the shape of a trough closed at both ends.

Radiators for motor-cars have usually a horizontal top portion between the two sloping end portions. (Shown at Fig. 1.) The header shown at Figs. 9 and 10 is suitable for use between the tubes, the tops and bottoms of which are in horizontal lines, while that shown at Fig. 10ª is suitable for use along the inclined ends.

$f$ is the filling tube or nozzle. It is formed with an inwardly-projecting annular rim $f'$, in which notches $f^2$ are formed.

$g$ is the improved filling-cap. $g'$ $g'$ are springs located in chambers or spaces in said cap, and $g^2$ represents balls against which the outer ends of the springs $g'$ bear. Apertures are made in the cylindrical part of the filling-cap, which allow the balls $g^2$ to protrude a certain distance, but not to pass altogether therethrough. When the filling-cap $g$ is in position in the filling-tube or nozzle $f$, the springs $g'$ force the balls $g^2$ underneath the flange or rim $f'$, thus forming spring-bolts, which securely retain the cap $g$ in position. If, however, pressure should unduly increase within the radiator or the like, the cap will be slightly lifted, thus exposing the upper ends of the notches $f^2$ to the open air and permitting escape of steam until the pressure is suitably reduced, thus preventing injury to the radiator.

$h$ is the ordinary filling-tube filter, and $i$ a space to receive the ordinary vent or blow-off tube or overflow-pipe, should such be desired.

Having now particularly described and ascertained the nature of my said invention and in what manner the same is to be performed, I declare that what I claim is—

1. In radiators, steam-condensers and the like, the combination of a tank-body, flat tubes communicating between the upper and lower portions of said body, trough-shaped gills or radiating surfaces formed of sheet metal, apertures in said gills or radiating surfaces and outwardly-extending flanges by which the gills or radiating surfaces are soldered between the tubes substantially as set forth.

2. In a radiator, steam-condenser and the like the combination of a tank-body, flat tubes communicating between the upper and lower portions of said tank-body and headers or filling-in pieces placed between the flat tubes at top and bottom thereof to form continuous plain surfaces to which the upper and lower parts of the tank can be readily soldered substantially as set forth.

3. In a radiator, steam-condenser and the like the combination of a filling-cap provided with spring-bolts, and a filling tube or nozzle having a notched inwardly-projecting rim under which the spring-bolts are pressed thus securing the filling-cap normally in position but allowing it to be raised by undue pressure and thereby give vent to the steam through the notches in the rim and so prevent injury to the radiator substantially as herein set forth.

In witness whereof I have hereunto set my hand in presence of two witnesses.

FREDERICK LAMPLOUGH.

Witnesses:
B. J. B. MILLS,
CLAUDE K. MILLS.